(12) United States Patent
Mallary et al.

(10) Patent No.: US 7,149,045 B1
(45) Date of Patent: Dec. 12, 2006

(54) LONGITUDINAL MEDIA WITH SOFT UNDERLAYER AND PERPENDICULAR WRITE HEAD

(75) Inventors: Michael L. Mallary, Sterling, MA (US); Steven Marshall, Northboro, MA (US); Mourad Benakli, Shrewsbury, MA (US); Adam F. Torabi, Shrewsbury, MA (US)

(73) Assignee: Maxtor Corporation, Scotts Valley, CA (US)

( * ) Notice: Subject to any disclaimer, the term of this patent is extended or adjusted under 35 U.S.C. 154(b) by 228 days.

(21) Appl. No.: 10/697,075

(22) Filed: Oct. 30, 2003

Related U.S. Application Data (60) Provisional application No. 60/424,533, filed on Nov. 7, 2002.

(51) Int. Cl.
  *G11B 5/09* (2006.01)
  *G11B 5/66* (2006.01)
  *G11B 5/667* (2006.01)

(52) U.S. Cl. .................... 360/55; 428/826; 428/828; 428/832.1; 428/832.3

(58) Field of Classification Search .................... None
  See application file for complete search history.

(56) References Cited

U.S. PATENT DOCUMENTS

| | | | | |
|---|---|---|---|---|
| 4,253,127 A | | 2/1981 | Kodama et al. ............. 360/125 |
| 4,317,148 A | | 2/1982 | Chi ............................. 360/119 |
| 4,423,450 A | | 12/1983 | Hamilton ..................... 360/111 |
| 4,656,546 A | | 4/1987 | Mallory ....................... 360/110 |
| 4,748,525 A | | 5/1988 | Perlov ......................... 360/110 |
| 5,041,922 A | * | 8/1991 | Wood et al. ................... 360/55 |
| 5,111,352 A | | 5/1992 | Das et al. ..................... 360/113 |
| 5,176,965 A | | 1/1993 | Mallary ....................... 428/694 |
| 5,431,969 A | | 7/1995 | Mallary ....................... 427/599 |
| 5,492,775 A | * | 2/1996 | Ahlert et al. ............. 428/836.2 |
| 5,680,283 A | | 10/1997 | Tanaka et al. ............... 360/125 |
| 5,830,590 A | * | 11/1998 | Gooch et al. ............... 428/829 |
| 5,843,565 A | | 12/1998 | Davies et al. ............... 428/212 |
| 6,495,252 B1 | * | 12/2002 | Richter et al. ............. 428/336 |
| 6,541,104 B1 | * | 4/2003 | Akimoto et al. ............ 428/212 |
| 6,807,027 B1 | * | 10/2004 | McGeehin et al. .......... 360/125 |
| 2001/0019786 A1 | * | 9/2001 | Ikeda ..................... 428/694 TM |
| 2003/0227701 A1 | * | 12/2003 | Clinton et al. ................ 360/46 |
| 2003/0227714 A1 | * | 12/2003 | Parker et al. ............... 360/125 |
| 2004/0067390 A1 | * | 4/2004 | Koda et al. .............. 428/694 T |
| 2005/0190478 A1 | * | 9/2005 | Hsiao et al. ................... 360/55 |

OTHER PUBLICATIONS

Mallary et al.; Improved Cross-Talk Performance From Multilayer Longitudinal Media Using A Hall Head; J. Appl. Phys., vol. 73, No. 10, May 15, 1993, pp. 6229-6231.

* cited by examiner

*Primary Examiner*—Andrea Wellington
*Assistant Examiner*—Dan I Davidson (57) ABSTRACT

A magnetic recording device including a longitudinal magnetic recording medium. The longitudinal magnetic recording medium includes a magnetically soft underlayer disposed under a longitudinal recording layer. A perpendicular write head is utilized to write data to the longitudinal magnetic recording medium wherein the longitudinal recording layer is disposed within an effective write gap formed by the perpendicular write head and the underlayer. The longitudinal component of the perpendicular write head is sufficient to switch the magnetic grains in the recording layer in the presence of the perpendicular field. The magnetic recording medium can have a high areal density and improved magnetic properties.

44 Claims, 8 Drawing Sheets

LONGITUDINAL MEDIA WITH SOFT UNDERLAYER AND PERPENDICULAR WRITE HEAD

CROSS-REFERENCE TO RELATED APPLICATIONS

This application claims priority from U.S. Provisional Patent Application No. 60/424,533, filed Nov. 7, 2002, entitled "Longitudinal Media with Soft Underlayer and Shielded Pole Writer," which is incorporated herein by reference in its entirety.

BACKGROUND OF THE INVENTION

1. Field of the Invention

The present invention relates to improved longitudinal (horizontal) magnetic recording media and recording devices incorporating the media. In particular, the present invention relates to longitudinal recording media having a magnetic recording layer and a magnetically soft underlayer (SUL). The longitudinal recording media can advantageously be used with a perpendicular type of write head, such as a shielded pole write head, to achieve a high areal density.

2. Description of Related Art

Thin film magnetic recording media are composed of multiple layers, including one or more magnetic recording layers, disposed on a substrate. Typically, the magnetic recording layer includes small magnetic grains that have an easy magnetization axis that is magnetically oriented longitudinally (i.e., in plane) with respect to the layer.

The areal density of longitudinal magnetic recording media has been increasing at a compounded growth rate of about 60% per year and areal densities as high as 100 Gbit/in$^2$ have been demonstrated. Scaling longitudinal recording media to higher areal densities requires smaller magnetic grains. However, as the grain size is reduced, thermal fluctuations can cause the magnetic domains to "flip", causing a loss of magnetization over a period of time. Higher coercivity media and an increased track density (tracks per inch, or TPI) can mitigate this problem. However, the large write head gaps that are needed for good overwrite of high coercivity media lead to excessive fringing, negatively affecting the data written on adjacent tracks. The large write head gaps also reduce the write field gradient and thus lead to increased transition jitter (a component of noise) and the requirement of large track width parameters, decreasing the obtainable areal density.

Longitudinal magnetic recording media with soft magnetic layers have been described in the art. U.S. Pat. No. 5,041,922 by Wood et al. discloses a longitudinal magnetic recording medium that includes a hard magnetic layer and a magnetically saturable, high permeability, low coercivity (soft) magnetic layer. During signal reproduction (reading), the bias flux from the read transducer forms a saturation zone in the saturable layer that directs signal flux between the medium and the transducer.

U.S. Pat. Nos. 5,176,965 and 5,431,969 both by Mallary disclose a magnetic medium for longitudinal recording. The medium includes a thin magnetic image underlayer, a magnetic recording layer and a non-magnetic buffer layer disposed between the image underlayer and the magnetic recording layer. Charges located in the magnetic layer induce virtual magnetic images of opposite charge in the underlying magnetic image underlayer. The virtual image charges reduce the fringing effect in adjacent tracks during read operations. It is disclosed that the magnetic image layer can be magnetically soft, semi-soft or semi-hard.

In addition to longitudinal recording, perpendicular (vertical) magnetic recording media have been proposed as a way to increase areal densities. Perpendicular magnetic recording media include a magnetic recording layer having an easy magnetization axis that is perpendicular to the layer. A perpendicular write head, such as a monopole write head or a shielded pole write head, is utilized to magnetize the grains in the perpendicular recording layer. Examples of perpendicular recording media and perpendicular write heads are disclosed in U.S. Pat. No. 4,656,546 by Mallary and U.S. Pat. No. 4,748,525 by Perlov.

Among the desirable properties for the magnetic recording layer is a high coercivity. Coercivity is a measure of the magnetization field that must be applied to reduce the remnant magnetization to zero, i.e., to reverse the direction of magnetization. A high coercivity assures that the magnetic layer will have a high resistance to demagnetization by stray magnetic fields and will have good thermal stability. However, high coercivity media also require a high field strength to reverse the direction of magnetization, making the media difficult to write.

Therefore, there is a need for a longitudinal recording medium having an increased coercivity and an associated read/write device effective to form a strong field gradient across the magnetic material. There is also a need for a longitudinal recording medium having a high areal density that is capable of producing an acceptably high signal-to-noise ratio (SNR).

BRIEF SUMMARY OF THE INVENTION

The present invention is directed to a magnetic recording device that includes a longitudinal recording layer that is effectively disposed within the write gap of a perpendicular write head, such as a shielded pole write head. This combination provides a high write field gradient and reduced transition width. As a result, fewer magnetic grains per bit are required in the magnetic recording layer to achieve an acceptable signal-to-noise ratio, thereby increasing the obtainable areal density. The magnetic recording layer can also have an increased coercivity for greater thermal stability. A magnetically soft underlayer imparts a keeper effect and allows for the use of a thicker magnetic recording layer.

According to one embodiment of the present invention, a magnetic recording device is provided. The magnetic recording device includes a perpendicular write head having a write pole including a write pole tip and a return pole. A recording medium including a longitudinal magnetic recording layer and a soft magnetic underlayer is disposed in relation to the perpendicular write head to place the magnetic recording layer within an effective write gap formed by the perpendicular write head and the underlayer during operation of the magnetic recording device. The perpendicular write head can be, for example, a shielded pole write head or a monopole write head. The magnetic recording medium can also include a non-magnetic spacer layer disposed between the longitudinal magnetic recording layer and the soft magnetic underlayer. The soft magnetic underlayer can have a magnetic coercivity of not greater than about 5 Oersteds (Oe) and can have a magnetic permeability of at least about 50. The soft magnetic underlayer preferably has a thickness sufficient to prevent saturation of the underlayer by the perpendicular write head during operation of the device. For example, the soft magnetic underlayer can have a thickness of from about 30 nanometers to about 200 nanometers.

According to another embodiment of the present invention, a magnetic recording device is provided that includes a shielded pole write head having a write pole tip and a write shield. A magnetic recording medium is disposed under the shielded pole write head, where the magnetic recording medium includes a soft magnetic underlayer having a permeability of at least about 50, a non-magnetic spacer layer disposed over the underlayer and a longitudinal magnetic recording layer disposed over the non-magnetic spacer layer.

According to another embodiment of the present invention, a magnetic recording medium is provided. The magnetic recording medium includes a substrate, an underlayer disposed over the substrate where the underlayer has a magnetic permeability of at least about 50, a non-magnetic spacer layer disposed over the underlayer and having a thickness of not greater than about 40 nanometers, and a longitudinal recording layer disposed over the non-magnetic spacer layer where the longitudinal recording layer has a coercivity of at least about 4000 Oe.

According to another embodiment, a method for writing data to a longitudinal recording layer is provided. The method includes the steps of providing a write head having a write pole and a return pole, disposing a longitudinal recording layer proximal to the write head, where the recording layer has a soft magnetic underlayer disposed under the recording layer, moving the longitudinal recording layer relative to the write head and generating a magnetic flux between the write pole tip and the soft magnetic underlayer. The magnetic flux is applied substantially perpendicular to the longitudinal recording layer and the magnetic flux is directed to the return pole by the soft magnetic underlayer.

DETAILED DESCRIPTION OF THE INVENTION

The present invention is directed to a magnetic recording medium and a magnetic recording device, wherein the magnetic recording medium includes a longitudinal magnetic recording layer. As used herein, a longitudinal magnetic recording layer is a magnetic recording layer where the magnetic grains have an easy magnetization axis that is oriented substantially parallel to the plane of the layer. The magnetic recording medium can be, for example, a magnetic tape or a magnetic hard disk, and in a preferred embodiment is a magnetic hard disk for use in a disk drive.

Figure 1:
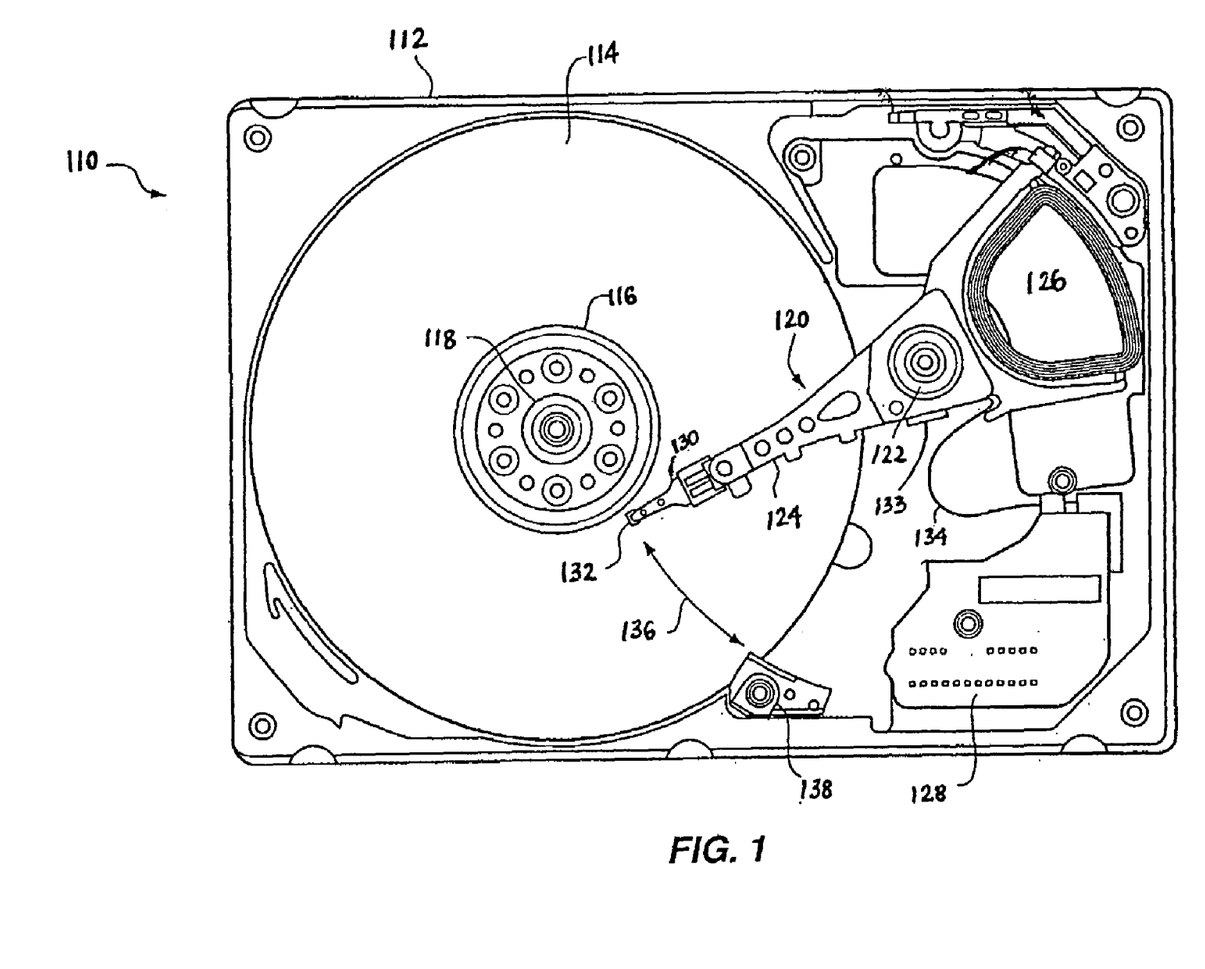
FIG. 1 illustrates a top or plan view of one embodiment of a disk drive.

FIG. 1 illustrates one embodiment of a disk drive 110. The disk drive 110 generally includes a base plate 112 and a cover (not shown) that may be disposed on the base plate 112 to define an enclosed housing or space for the various disk drive components. The disk drive 110 includes one or more data storage disks 114 of any appropriate computer-readable data storage media. Typically, both of the major surfaces of each data storage disk 114 include a plurality of concentrically disposed tracks for data storage purposes. Each disk 114 is mounted on a hub or spindle 116, which in turn is rotatably interconnected with the disk drive base plate 112 and/or cover. Multiple data storage disks 114 are typically mounted in vertically spaced and parallel relation on the spindle 116. Rotation of the disk(s) 114 is provided by a spindle motor 118 that is coupled to the spindle 116 to simultaneously spin the data storage disk(s) 114 at an appropriate rate.

The disk drive 110 also includes an actuator arm assembly 120 that pivots about a pivot bearing 122, which in turn is rotatably supported by the base plate 112 and/or cover. The actuator arm assembly 120 includes one or more individual rigid actuator arms 124 that extend out from near the pivot bearing 122. Multiple actuator arms 124 are typically disposed in vertically spaced relation, with one actuator arm 124 being provided for each major data storage surface of each data storage disk 114 of the disk drive 110. Other types of actuator arm assembly configurations could be utilized as well, such as an "E" block having one or more rigid actuator arm tips or the like that cantilever from a common structure. In any case, movement of the actuator arm assembly 120 is provided by an actuator arm drive assembly, such as a voice coil motor 126 or the like. The voice coil motor 126 is a magnetic assembly that controls the operation of the actuator arm assembly 120 under the direction of control electronics 128. Any appropriate actuator arm assembly drive type may be utilized by the disk drive 110, including a linear drive (for the case where the actuator arm assembly 120 is interconnected with the base plate 112 and/or cover for linear movement versus the illustrated pivoting movement about the pivot bearing 122) and other types of rotational drives.

A load beam or suspension 130 is attached to the free end of each actuator arm 124 and cantilevers therefrom. Typically, the suspension 130 is biased generally toward its corresponding disk 114 by a spring-like force. A slider 132 is disposed at or near the free end of each suspension 130. What is commonly referred to as the read/write head (e.g., transducer) is appropriately mounted on the slider 132 and is used in disk drive read/write operations.

The head on the slider 132 may utilize various types of read sensor technologies such as anisotropic magnetoresistive (AMR), giant magnetoresistive (GMR), tunneling magnetoresistive (TuMR), other magnetoresistive technologies, or other suitable technologies. AMR is due to the anisotropic magnetoresistive effect with a normalized change in resistance (AR/R) of 2–4%. GMR results from spin-dependent scattering mechanisms between two (or more) magnetic layers. The typical use in recording heads is the spin valve device that uses a pinned magnetic layer and a free layer to detect external fields. The normalized change in on-wafer resistance is typically 8–12%, but can be as large as 15–20% when used with specular capping layers and spin-filter layers. TuMR is similar to GMR, but is due to spin dependent tunneling currents across an isolation layer. The typical embodiment includes a free layer and a pinned layer separated by an insulating layer of $Al_2O_3$ with the current flowing perpendicular to the film plane, producing normalized change in resistance of 12–25%. The term magnetoresistive is used in this application to refer to all these types of magnetoresistive sensors and any others in which a variation in resistance of the sensor due to the application of an external magnetic field is detected. The read/write head of the present invention is discussed in further detail below.

The biasing forces exerted by the suspension 130 on its corresponding slider 132 moves the slider 132 in the direction of its corresponding disk 114. Typically, this biasing force is such that if the slider 132 were positioned over its corresponding disk 114, without the disk 114 being rotated at a sufficient velocity, the slider 132 would be in contact with the disk 114.

The head on the slider 132 is connected to a preamplifier 133, which is interconnected with the control electronics 128 of the disk drive 110 by a flex cable 134 that is typically mounted on the actuator arm assembly 120. Signals are exchanged between the head and its corresponding data storage disk 114 for disk drive read/write operations. In this regard, the voice coil motor 126 is utilized to pivot the actuator arm assembly 120 to simultaneously move the slider 132 along a path 136 and "across" the corresponding data storage disk 114 to position the head at the desired/required radial position on the disk 114 (i.e., at the approximate location of the correct track on the data storage disk 114) for disk drive read/write operations.

When the disk drive 110 is not in operation, the actuator arm assembly 120 is pivoted to a "parked position" to dispose each slider 132 generally at or beyond a perimeter of its corresponding data storage disk 114, but in any case in vertically spaced relation to its corresponding disk 114. This is commonly referred to in the art as being a dynamic load/unload disk drive configuration. In this regard, the disk drive 110 includes a ramp assembly 138 that is disposed beyond a perimeter of the data storage disk 114 to typically both move the corresponding slider 132 vertically away from its corresponding data storage disk 114 and to also exert somewhat of a retaining force on the actuator arm assembly 120. Any configuration for the ramp assembly 138 that provides the desired "parking" function may be utilized. The disk drive 110 could also be configured to be of the contact start/stop type, where the actuator arm assembly 120 would pivot in a direction to dispose the slider(s) 132 typically toward an inner, non-data storage region of the corresponding data storage disk 114. Terminating the rotation of the data storage disk(s) 114 in this type of disk drive configuration would then result in the slider(s) 132 actually establishing contact with or "landing" on its corresponding data storage disk 114, and the slider 132 would remain on the disk 114 until disk drive operations are re-initiated.

The slider 132 of the disk drive 110 may be configured to "fly" on an air bearing during rotation of its corresponding data storage disk(s) 114 at a sufficient velocity. The slider 132 may be disposed at a pitch angle such that its leading edge is disposed further from its corresponding data storage disk 114 than its trailing edge. The read/write head would typically be incorporated on the slider 132 generally toward its trailing edge since this is positioned closest to its corresponding disk 114. Other pitch angles/orientations could also be utilized for flying the slider 132.

Figure 2:
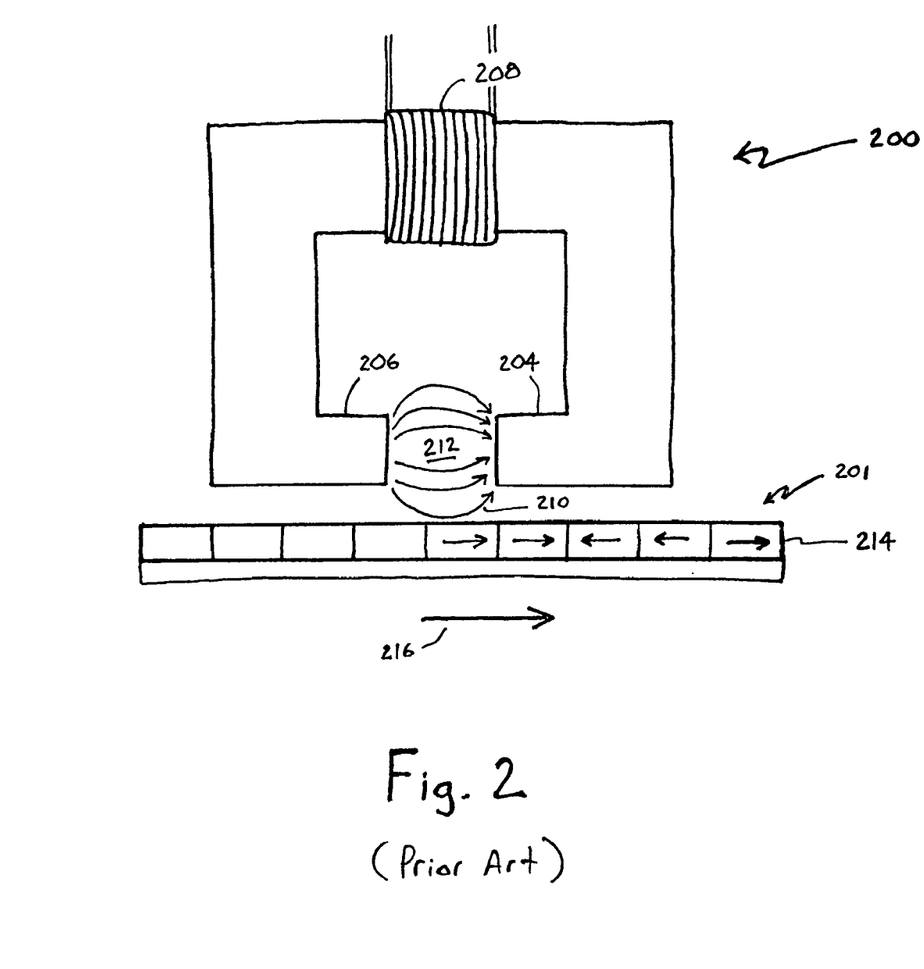
FIG. 2 illustrates a schematic side view of a write head adjacent to a longitudinal recording medium according to the prior art.

Referring to FIG. 2, a write head 200 and longitudinal recording medium 201 (e.g., a data storage disk) according to the prior art are illustrated. The write head 200 (commonly referred to as a ring head) floats above the surface of a longitudinal recording layer 214 of a magnetic recording medium 201 as the magnetic recording medium moves in the direction of arrow 216 during operation. It will be appreciated by those skilled in the art that the magnetic recording medium 201 can include other layers (not illustrated) such as underlayers and seedlayers.

The longitudinal write head 200 includes first and second write poles 204 and 206, which define a write gap 212 between the poles. When an electric current is passed through the coils 208, a magnetic flux 210 is developed in the write gap 212. Changing the direction of the current in the coils 208 changes the polarity of the magnetic flux 210 in the gap 212. During operation, the recording head 200 is passed above and in close proximity to the longitudinal recording layer 214. The fringe portion of the flux 210 magnetizes the magnetic grains in the recording layer 214 in a longitudinal direction. It is noteworthy that the magnetic recording layer 214 is not disposed within the write gap 212 of the write head 200, but is disposed in proximity to the fringing field of the magnetic flux 210. Thus, the polarity of the magnetic domains in the magnetic recording layer 214 is switched by the fringing field of the flux 210 generated between the poles 204 and 206. This results in a relatively low field gradient and difficulty writing to a recording layer 214 having a high coercivity. Increasing the strength of the magnetic field in the gap 212 (e.g., by increasing the size of the gap 212) can result in off-track fringing signals, interfering with adjacent tracks on the recording layer 214, thereby decreasing the obtainable areal density for the recording medium 201.

Figure 3:
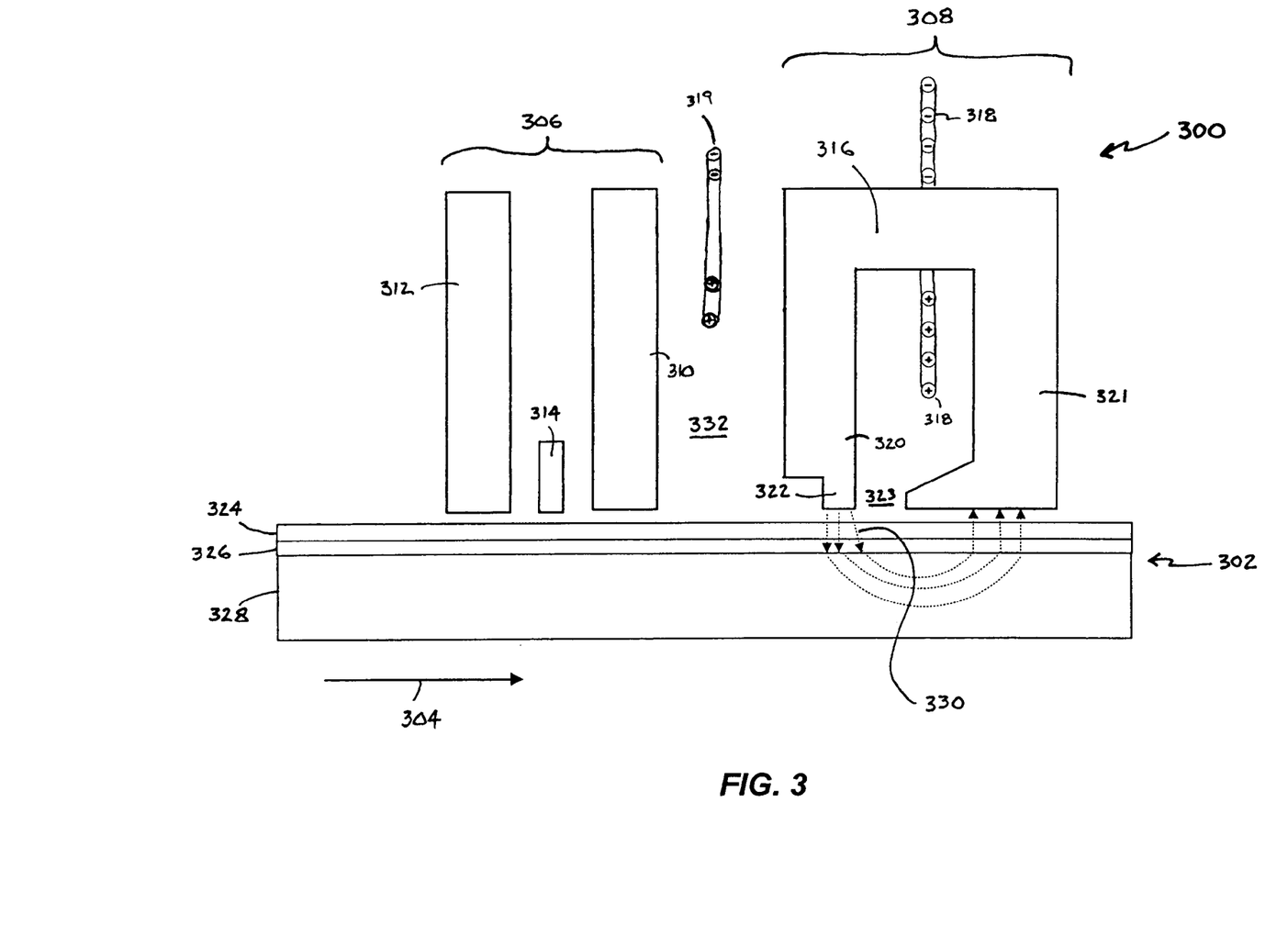
FIG. 3 illustrates a schematic side view of a longitudinal magnetic recording medium and perpendicular read/write head (shielded pole write head) according to an embodiment of the present invention.

FIG. 3 illustrates a schematic side view of a longitudinal magnetic recording medium in combination with a perpendicular write head, specifically a shielded pole write head, according to the present invention. A shielded pole write head is disclosed in U.S. Pat. No. 4,656,546 by Mallary, which is incorporated herein by reference in its entirety. A shielded pole write head is also disclosed in commonly-owned U.S. patent application Ser. No. 10/365,287, filed on Feb. 12, 2003 and entitled "Floating Down Stream Perpendicular Write Head Shield," which is also incorporated herein by reference in its entirety.

Referring to FIG. 3, the relevant portions of a read/write head 300 are illustrated adjacent to a portion of a magnetic recording medium 302 that is moving relative to the head 300 in a direction shown by arrow 304. The read/write head 300 includes a read portion 306 for detecting bits in the magnetic recording layer 324 and a write portion 308 for writing bits in the magnetic recording layer 324.

The read portion 306 includes a first shield 312 and a second shield 310. Disposed between the shields 310 and 312 is a magneto restrictive (MR) sensor stripe 314. The MR sensor stripe 314 may utilize the various MR sensor technologies, and in one embodiment a GMR sensor is employed.

The write portion 308 of the read/write head 300 includes a write yoke 316 connected at one end to a downstream return pole, in this case a write shield 321. Wrapped around the write yoke 316 are a plurality of pancake-shaped electrically conductive coils 318. A write pole 320 is constructed parallel to the second read shield 310 and in contact at one end thereof with the write yoke 316. The write pole 320 terminates at an opposite end with a write pole tip 322, which has a reduced cross-section as compared to the remainder of the write pole 320. As compared to a longitudinal write head (FIG. 2), the write pole tip 322 is relatively thin to minimize skew problems and preferably has a trapezoidal shape. The end of the write pole tip 322 is generally vertically aligned with the ends of the read shields 310 and 312 and the MR sensor stripe 314, and is located extremely close to the planar upper surface of the magnetic recording medium 302. As illustrated in FIG. 3, the write shield 321 is downstream from the write pole 320.

It will be appreciated that an extra coil 319 (a bucking coil) may be used between the write pole 320 and the second read shield 310 to reduce flux coupling. When a bucking coil 319 is utilized, it is preferred that the number of turns in the bucking coil 319 is equal to or less than the number of turns in the write coil 318. Flux coupling between the second read shield 310 and the write pole 320 can also be reduced by wrapping the write coil 318 around the write pole 320, thus forming a solenoidal coil. However, the use of a large write pole to read shield gap 332 can reduce flux coupling without the use of a bucking coil. A large write gap 323 and a large area write shield 321 increase the write field strength under the write pole tip 322. A small write gap 323 between the write pole 320 and the write shield 321 reduces the field strength but increases the field gradient.

The magnetic recording medium 302 includes a longitudinal magnetic recording layer 324 adjacent to the read/write head 300 and a soft underlayer (SUL) 328 on the opposite side of the magnetic recording layer 324 from the read/write head 300. A non-magnetic spacer layer 326 is disposed between the recording layer 324 and the underlayer 328. As is discussed in more detail below, the magnetic recording layer 324 is preferably a hard magnetic material while the SUL 328 is preferably a soft magnetic material. A soft magnetic material generally has a high permeability and a low coercivity, whereas a hard magnetic material has a low permeability and a high coercivity.

During operation, the magnetic flux 330 from the write pole tip 322, in the region of high field gradient, passes through the magnetic recording layer 324 in a direction that is slanted with respect to the perpendicular axis of the layer and into the SUL 328. As is discussed in more detail below, the magnetic flux 330 in the region of high field gradient includes a longitudinal component that is sufficient to switch longitudinally oriented grains in the longitudinal magnetic recording layer 324. That is, although the perpendicular component of the magnetic flux is greater than the longitudinal component, the longitudinal component is sufficient to switch magnetic grains in the magnetic recording layer. The SUL 328 provides a high permeability pathway for the flux 330 to return to the write shield 321. In this manner, magnetic recording layer 324 is disposed within the write gap of the read/write head 300. When the current applied to the coils 318 changes polarity, the flux passes from the shield 321, through the underlayer 328 and to the write pole tip 322.

Figure 4:
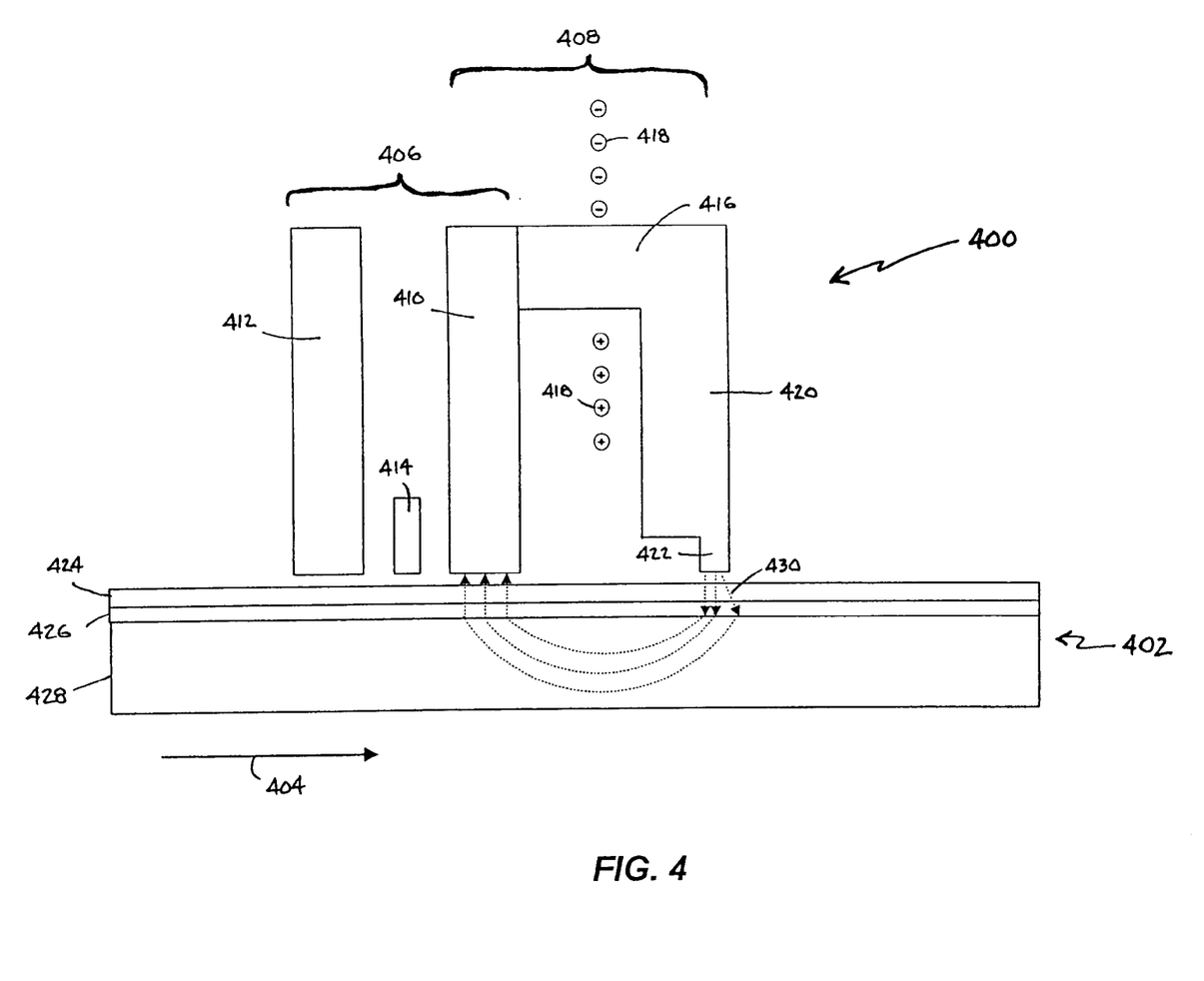
FIG. 4 illustrates a schematic side view of a longitudinal magnetic recording medium and perpendicular read/write head (monopole write head) according to an embodiment of the present invention.

The perpendicular write head can also be a monopole write head. Referring to FIG. 4, a monopole read/write head and longitudinal recording medium are illustrated. The relevant portions of a read/write head 400 are illustrated adjacent to a portion of a magnetic recording medium 402 that is moving relative to the head 400 in a direction shown by arrow 404. The read/write head 400 includes a read portion 406 and a write portion 408, that together utilize a shared shield 410, the shared shield 410 being upstream from the write pole 420 and functioning as a return pole. The read portion 406 includes a first shield 412 and the shared shield 410. Disposed between the shields 410 and 412 is a magneto restrictive (MR) sensor stripe 414. The MR sensor stripe 414 may utilize the various MR sensor technologies, and in one embodiment a GMR sensor is employed.

The write portion 408 of the read/write head 400 includes a write yoke 416 connected at one end to the shared shield 410. Wrapped around the write yoke 416 are a plurality of pancake-shaped electrically conductive coils 418. A write pole 420 is constructed parallel to the shared shield 410 and in contact at one end thereof with the write yoke 416. The write pole 420 terminates at an opposite end with a write pole tip 422, which has a reduced cross-section as compared to the remainder of the write pole 420. The write pole tip 422 is relatively thin to minimize skew problems and preferably has a trapezoidal shape. The end of the write pole tip 422 is generally vertically aligned with the ends of the shields 410 and 412 and the MR sensor stripe 414, and is located extremely close to the planar upper surface of the magnetic recording medium 402.

The magnetic recording medium 402 includes a longitudinal magnetic recording layer 424 adjacent to the read/write head 400 and a soft underlayer (SUL) 428 on the opposite side of the magnetic recording layer 424 from the read/write head 400. A non-magnetic spacer layer 426 is disposed between the recording layer 424 and the underlayer 428. The magnetic recording layer 424 is preferably a hard magnetic material while the SUL 428 is preferably a soft magnetic material.

During operation, the magnetic flux 430 from the write pole tip 422, in the region of high field gradient, passes through the magnetic recording layer 424 in a direction that is slanted with respect to the perpendicular axis of the layer and into the SUL 428. The SUL 428 provides a high permeability pathway for the flux 430 to return to the shield 410. In this manner, magnetic recording layer 424 is effectively disposed within the write gap of the read/write head 400. When the current applied to the coils 418 changes polarity, the flux passes from the shield 410, through the underlayer 428 and to the write pole tip 422.

Figure 5:
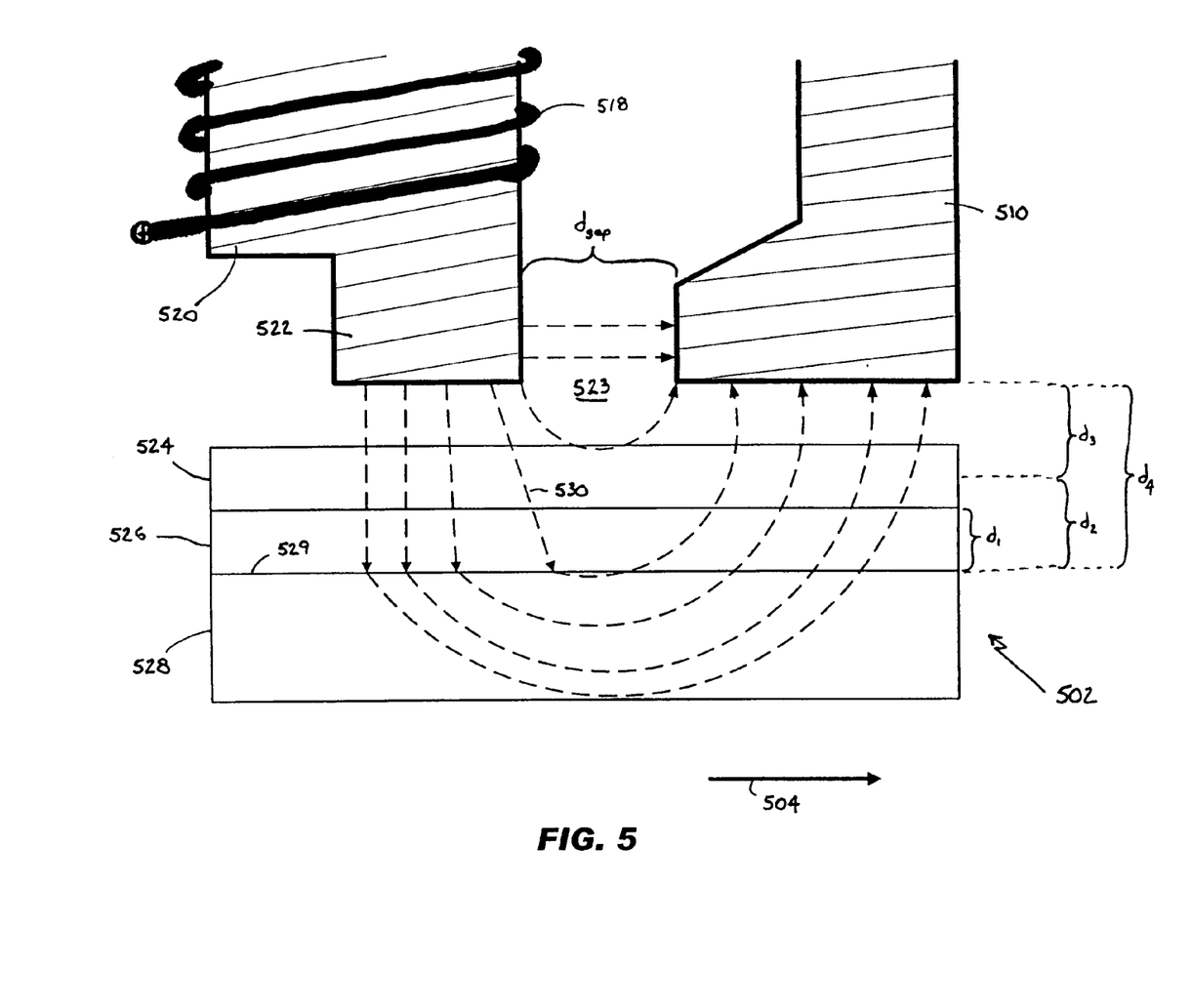
FIG. 5 illustrates a schematic side view of a longitudinal magnetic recording medium and a perpendicular write head (shielded pole write head) according to an embodiment of the present invention.

A more detailed view of a write pole, write shield and magnetic recording medium, such as that illustrated in FIG. 3, is illustrated in FIG. 5. As illustrated in FIG. 5, the recording medium 502 moves in the direction of arrow 504 relative to the write pole 520 and write shield 510. In the embodiment illustrated in FIG. 5, the write coil 518 is wrapped around the write pole 520 forming a solenoidal coil. The flux 530 generated by the write pole tip 522 at the end of the write pole 520 extends through the magnetic recording layer 524 in the region of high field gradient in a direction that is slanted to the perpendicular axis of the magnetic recording medium 502 and into the soft underlayer 528. The soft underlayer 528 is of a sufficient thickness and permeability that the soft underlayer does not saturate and the flux 530 is directed back to the write shield 510. A non-magnetic spacer layer 526 disposed between the soft underlayer 528 and the magnetic recording layer 524 reduces the loss of high frequency read signals.

The thickness ($d_1$) of the non-magnetic spacer layer 526 is preferably selected such that the distance ($d_2$) from the center of the longitudinal magnetic recording layer 524 to the top surface 529 of the soft underlayer 528 is about equal to the distance ($d_3$) from the center of the longitudinal magnetic recording layer 524 to the pole tip 522, a distance referred to herein as the magnetic spacing ($d_2 \approx d_3$).

Further, the width ($d_{gap}$) of the gap 523 from the write pole 520 to the write shield 510 is preferably selected to be about equal to the distance ($d_4$) from the write pole 520 to the top of the soft underlayer 528. ($d_2 + d_3 = d_4 \approx d_{gap}$). More specifically, $d_{gap}$ is preferably no more than about twice as large and no smaller than twice as small as $d_4$. This configuration yields an acceptable trade-off between write field strength and write field gradient. In one preferred embodiment, $d_{gap}$ is from about 40 to about 80 nanometers.

In accordance with the foregoing, the thickness of the non-magnetic spacer layer ($d_1$) is preferably from about 10 to 25 nanometers. The distance from the top of the SUL to the center of the longitudinal recording layer ($d_2$) is preferably from about 13 to 31 nanometers. The distance $d_3$ from the center of the recording layer to the pole tip during operation of the recording device (the magnetic spacing) is preferably from about 10 to about 30 nanometers and is preferably about equal to $d_2$, and more specifically is preferably no greater than about 20% larger or smaller than $d_2$. In one embodiment, both $d_2$ and $d_3$ are each from about 15 nanometers to about 30 nanometers.

Utilizing the foregoing criteria according to the present invention, the longitudinal magnetic recording layer 524 is effectively disposed within the write gap of the write head. It has been found that although the primary write head field is perpendicular to the recording layer, the field also has a longitudinal component that is sufficient to switch the longitudinally oriented magnetic grains in the recording layer. The polarity of the longitudinal field component can be switched by switching the polarity of the perpendicular component, i.e., by changing the polarity of the current in the coils.

Figure 6:
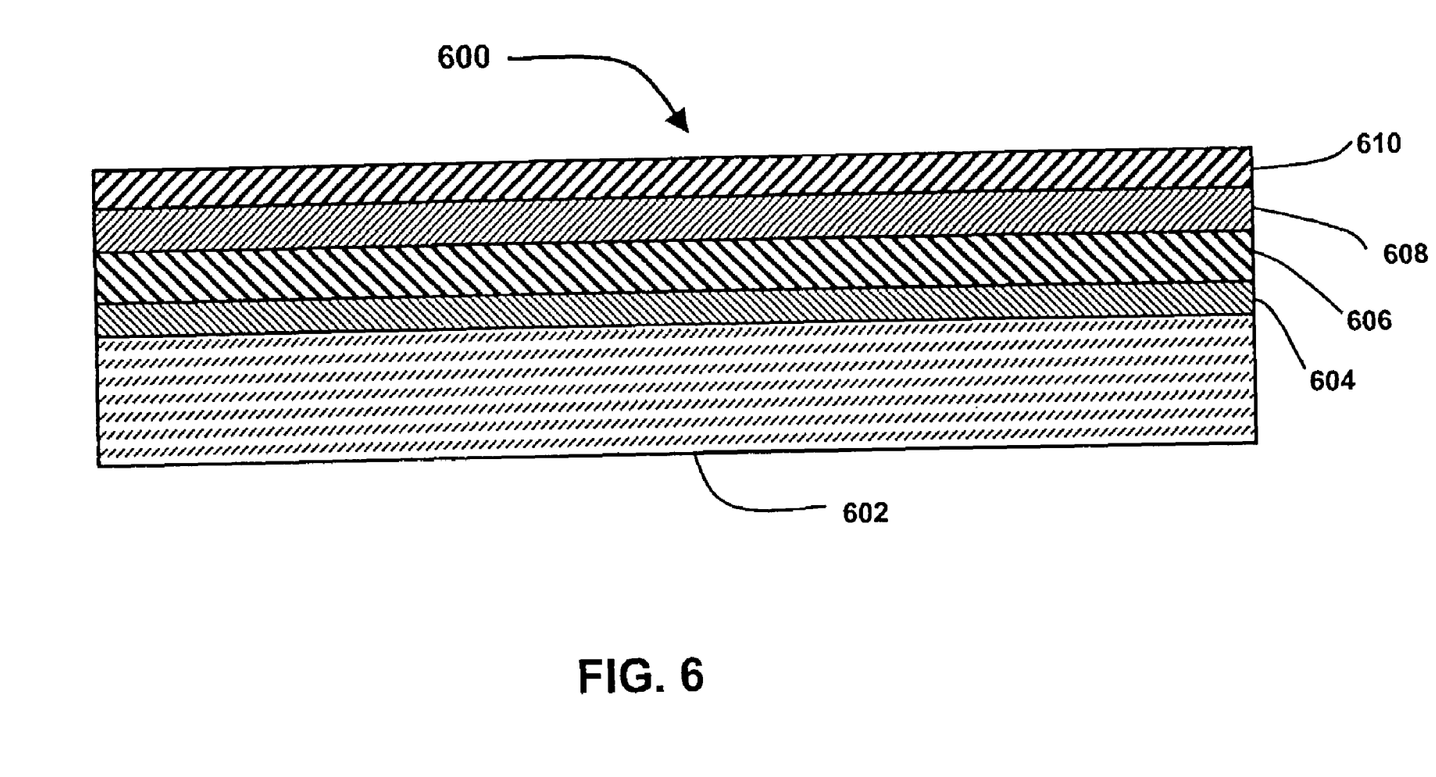
FIG. 6 illustrates a cross-sectional view of a longitudinal recording medium according to an embodiment of the present invention.

FIG. 6 illustrates a cross-sectional view of a longitudinal magnetic recording medium, namely a hard disk, in accordance with the present invention. The medium includes a rigid substrate 602 for supporting the overlying layers. The substrate 602 can be fabricated from a variety of materials such as aluminum or an aluminum alloy coated with nickel phosphorous (NiP), or a glass or glass-ceramic. A seedlayer 604 or other intermediate layers known to those skilled in the art can be provided, such as to enhance the crystallographic properties of the magnetic layers disposed thereon.

The magnetic recording medium 600 includes a longitudinal magnetic recording layer 610 and a soft underlayer 606, with a non-magnetic spacer layer 608 disposed between the recording layer 610 and the soft underlayer 606. The spacer layer 608 is adapted to reduce the loss of high frequency read signals without substantially degrading the write field strength or the write field gradient. Typically, the spacer layer 608 will have an average thickness of not greater than about 40 nanometers, more preferably not greater than about 20 nanometers. The spacer layer 608 preferably has a thickness of at least about 10 nanometers and in one embodiment, the average thickness is from about 10 to about 25 nanometers. The non-magnetic spacer layer can be fabricated from, for example, Cr, Ta, NiAl, or other alloys that result in good growth properties of the magnetic hard layer.

The soft underlayer 606 is essential to obtain a high write field and a strong write field gradient, leading to an increased areal density and other improved properties in the longitudinal recording layer 610. Unlike soft underlayers disclosed in the prior art in connection with longitudinal layers, the soft underlayer 606 does not saturate during write operations. During read operations, the soft underlayer 606 provides a partial keeper effect that enhances magnetic stability while not absorbing all of the read flux because of the spacer layer 608. The soft underlayer 606 can selectively absorb the low frequency component of the read flux, thereby narrowing the pulse width ($PW_{50}$) and reducing the dynamic range requirement of the read transducer.

The soft underlayer 606 can be fabricated from a variety of soft magnetic materials such as NiFe, FeTaC or CoZrNb. Preferably, the soft underlayer has a magnetic permeability ($\mu$) of at least about 50, even more preferably at least about 100 and even more preferably at least about 500. Further, the coercivity ($H_c$) of the soft underlayer should be relatively low and in one embodiment is not greater than about 5 Oe, more preferably not greater than about 2 Oe. The soft underlayer preferably has a thickness of at least about 30 nanometers, more preferably at least about 50 nanometers, and even more preferably at least about 100 nanometers. In one embodiment, the soft underlayer has a thickness of from about 30 nanometers to about 200 nanometers, such as from about 100 to about 200 nanometers. The thickness and magnetic properties of the soft underlayer should be sufficient such that the soft underlayer does not saturate during write operations.

The longitudinal magnetic recording layer 610 has an easy magnetization axis that is oriented parallel with the surface of the recording layer. Useful materials for the magnetic recording layer 610 include cobalt-based alloys, such as those having a hexagonal close packed (hcp) crystal structure. Cobalt can be alloyed with elements such as chromium (Cr), platinum (Pt), boron (B), niobium (Nb), tungsten (W) and tantalum (Ta). For example, the magnetic recording layer 610 can include cobalt alloyed with chromium, platinum and boron (CoCrPtB). The magnetic recording layer 610 preferably has an average thickness of not greater than about 15 nanometers, such as from about 7 to about 12 nanometers. It will be appreciated by those skilled in the art that multiple magnetic recording layers can be utilized. Longitudinal anisotropy can be induced in the longitudinal magnetic recording layer 610 by the selection of suitable alloys for the recording layer 610 and the spacer layer 608.

The present invention enables the use of a recording medium wherein the longitudinal recording layer has a high coercivity. The use of a high coercivity longitudinal recording layer is enabled by the properties of the longitudinal switching field applied by the perpendicular write head. According to one embodiment, the longitudinal recording layer has a coercivity of at least about 4000 Oe and more preferably at least about 5000 Oe.

Simulations of a shielded pole perpendicular write head on a longitudinal magnetic recording medium having a longitudinal recording layer, a soft underlayer (SUL) and a non-magnetic spacer layer according to the present invention are illustrated in FIGS. 7–10.

Figure 7:
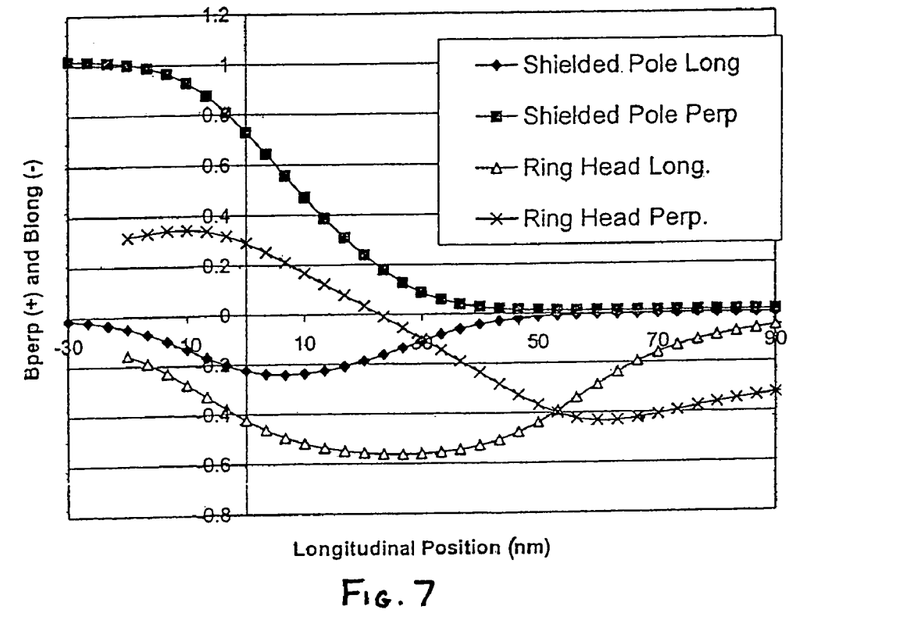
FIG. 7 illustrates perpendicular and longitudinal magnetic fields as a function of longitudinal position generated by a shielded pole write head and a ring write head.

FIG. 7 illustrates that a large increase in writeability and normalized write field gradient can be achieved using a perpendicular write head relative to conventional longitudinal recording using a ring head. Specifically, FIG. 7 shows the calculated longitudinal magnetic field ($B_{long}$) and perpendicular magnetic field ($B_{perp}$) at a distance 15 nanometers from the pole tips for a shielded pole perpendicular write head compared to a longitudinal ring head. For the shielded pole perpendicular write head, the effective write head gap is equal to the distance from the pole tip to the upper surface of the soft underlayer (i.e., $d_4$ in FIG. 5) and in this case is 25 nanometers (e.g., where the magnetic recording layer is 10 nanometers thick and the spacer layer is 5 nanometers thick). The longitudinal ring head used for comparison has a write head gap of 50 nanometers and a magnetic potential asymmetry of 76%. This asymmetry arises since the total area of the bottom pole plus the read shield is much larger than the area of the write yoke. This produces a large asymmetry in the magnitude of the magnetic potentials at the pole tips. In each case, the gap field is normalized to 1.0. As expected, the longitudinal ring head has a higher longitudinal field than the perpendicular head, but a lower perpendicular field.

However, it has been found that both the longitudinal and perpendicular field components are important for switching the polarity of magnetic grains. To account for the combined effect of the two components, the Stoner-Wolfarth switching field strength ($H_{sw}$) can be calculated from Equation 1:

$$H_{sw} = H_{total}[\sin(\theta)^{2/3} + \cos(\theta)^{2/3}]^{2/3} \quad (1)$$

where $H_{total}$ is the absolute value of the magnetic field and $\theta$ is the angle between the magnetic field and the easy magnetization axis of the magnetic grain. For a field parallel to the easy magnetization axis ($\theta=0$), $H_{sw}=H_{total}$.

Figure 8:
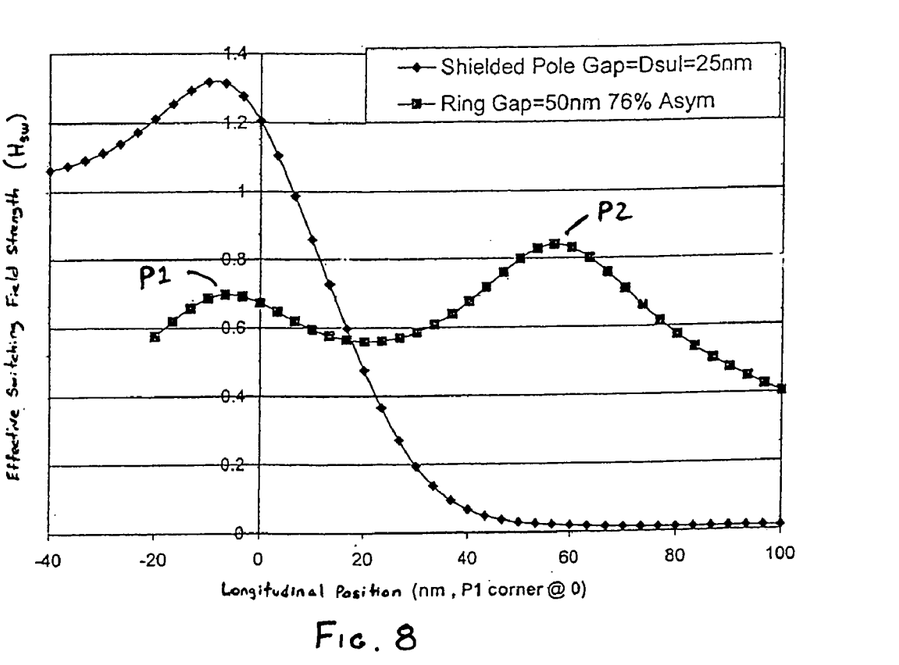
FIG. 8 illustrates the effective switching field strength as a function of longitudinal position for a shielded pole write head and a ring write head.

Because $\sin(\theta+90)=\cos(\theta)$, Equation 1 applies equally to perpendicular grains and circumferential grains, ignoring self demagnetization field effects. FIG. 8 illustrates the calculated Stoner-Wolfarth switching field for the same shielded pole perpendicular write head and the longitudinal ring head configurations of FIG. 7. It can be seen that the shielded pole perpendicular write head has more normalized field gradient and a higher maximum field strength. In operation, the longitudinal ring head writes on the right most slope, where the peak P2 is higher than the left-hand peak P1.

Figure 9:
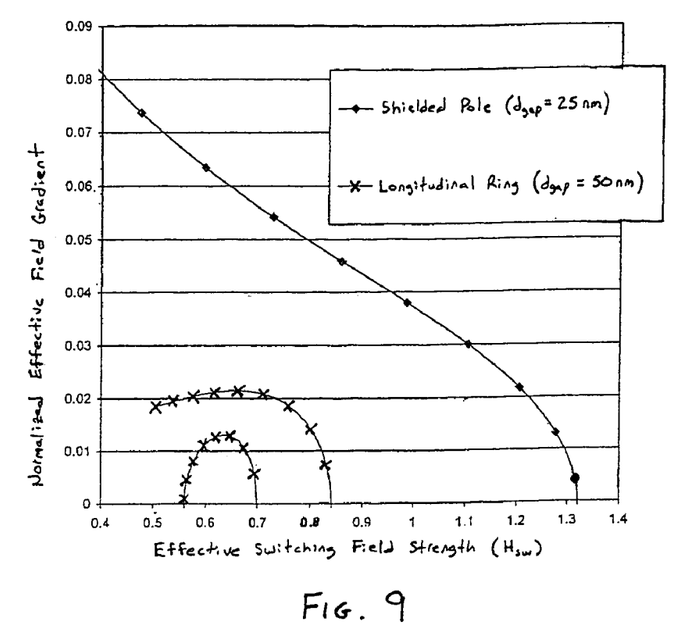
FIG. 9 illustrates the normalized effective field gradient as a function of effective switching field strength for a shielded pole write head and a ring write head.

Because of the complex trade-off between the write field (switching field) strength and normalized gradient, it is useful to plot them against each other. This is illustrated in FIG. 9 for the same shielded pole write head and the ring head configurations of FIGS. 7 and 8. The longitudinal ring head has two plots, corresponding to peaks P1 and P2 in FIG. 8. As is illustrated in FIG. 9, the normalized field gradient of the shielded pole perpendicular write head is high at low switching field strengths. At $H_{sw}=0.65$, where the ring head has a maximum normalized gradient, the shielded pole head has a 2.8× higher gradient. Further, the peak switching field strength of the shielded pole perpendicular write head is 55% higher than the peak switching field strength of the longitudinal ring head.

Figure 10:
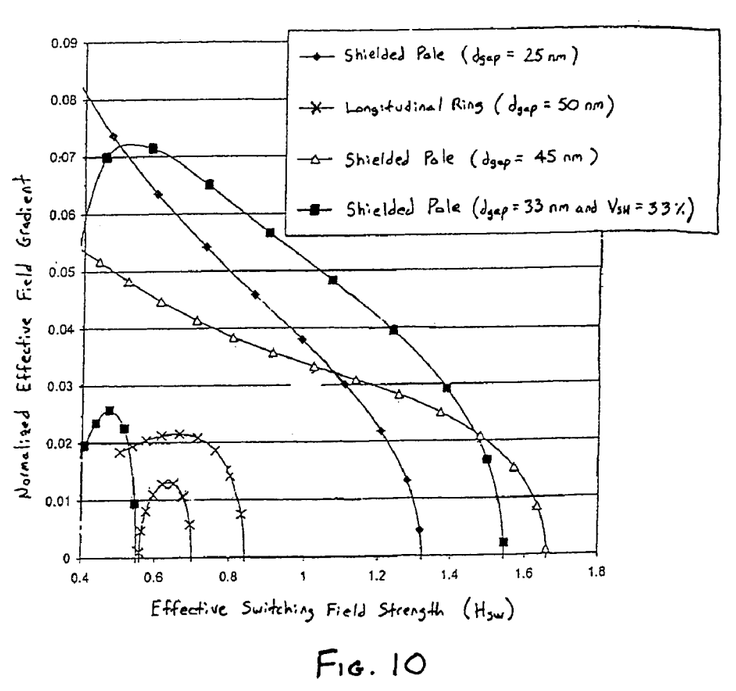
FIG. 10 illustrates the normalized gradient as a function of switching field strength for various shielded pole write heads and a ring write head.

The results for two other configurations of a shielded pole head are illustrated in FIG. 10 along with the curves from FIG. 9. FIG. 10 illustrates that if the non-magnetic spacer layer thickness in the longitudinal media is increased from 5 nanometers to 25 nanometers (e.g., the effective write head gap goes from 25 nanometers to 45 nanometers for a magnetic recording layer thickness of 10 nanometers), the maximum switching field for the shielded pole head becomes 82% better than for the ring head, but the maximum gradient at $H_{sw}=0.65$ is only 2× better.

Also illustrated in FIG. 10 are the calculated results obtained by increasing the shielded pole gap to 33 nanometers and applying −⅓ magneto-motive force ($V_{SH}$) to the shield. The resulting field under the shield (e.g., $H_{sw}=0.55$) is just below that which could erase adjacent track data with repeated passes if the media anisotropy field is optimally set at $H_k=1.06H_{sw}$ so that write occurs at the point of maximum gradient. Under these circumstances the gradient of the shielded pole write head is 3.4× better than that of the ring head at $H_{SW}=0.7$. In a system in which the transition width is not limited by the magnetic grain size, this can be expected to yield up to a 5× increase in areal density. Negative $V_{SH}$ can be optimized with a bucking coil that has fewer turns than the write coil and is located between the write pole and the second read shield (See FIG. 3). Alternatively, this can be accomplished by adjusting the distance from the write pole to the second read shield.

The foregoing combination of a longitudinal magnetic recording medium disposed in the write gap of a perpendicular write head improves the write and read processes as compared to longitudinal media utilized in combination with a longitudinal read/write head. The write field generated by the magnetic recording device of the present invention has a greater ability to switch the magnetic recording layer due to an increased field gradient and the combined effect of the horizontal and perpendicular field components. The soft underlayer provides a partial keeper effect that enhances magnetic stability while not absorbing all of the read flux. The soft underlayer selectively absorbs the low frequency component of the read back flux, narrowing the pulse width and reducing the dynamic range requirement of the read transducer.

The longitudinal media according to the present invention offers numerous advantages. When used in conjunction with a perpendicular write head, such as a shielded pole write head, the write field gradient can be increased by a factor of 3 times, enabling the writing of sharp transitions on longitudinal media. For the same normalized gradient, media having 1.5 times higher coercivity can be written. This increases the thermal stability of the media and as a result smaller grains can be used in the longitudinal magnetic recording layer, which in turn allows for smaller bit areas for a given number of grains per bit, also leading to higher areal densities. The net SNR gain can be more than 9 dB. As a result, fewer magnetic grains per bit are required for adequate SNR and an increase in areal density of up to 2 times and even up to 3 times is enabled using the same longitudinal magnetic recording layer.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A magnetic recording device, comprising:
  a) a perpendicular write head comprising a write pole having a write pole tip, and a return pole; and
  b) a recording medium comprising a longitudinal magnetic recording layer, a soft magnetic underlayer and, a non-magnetic spacer layer disposed between said longitudinal magnetic recording layer and said soft magnetic underlayer wherein during operation of said magnetic recording device said longitudinal recording layer is disposed in relation to said perpendicular write head to place said magnetic recording layer within an effective write gap formed by said perpendicular write head and said underlayer.

2. A magnetic recording device as recited in claim 1, wherein said perpendicular write head is a shielded pole write head comprising a write shield.

3. A magnetic recording device as recited in claim 1, wherein said perpendicular write head is a monopole write head.

4. A magnetic recording device as recited in claim 1, wherein said non-magnetic spacer layer has a thickness of not greater than about 40 nanometers.

5. A magnetic recording device as recited in claim 1, wherein said non-magnetic spacer layer has a thickness of not greater than about 20 nanometers.

6. A magnetic recording device as recited in claim 1, wherein said non-magnetic spacer layer has a thickness of from about 10 to 25 nanometers.

7. A magnetic recording device as recited in claim 1, wherein said soft magnetic underlayer comprises NiFe.

8. A magnetic recording device as recited in claim 1, wherein said soft magnetic underlayer has a magnetic coercivity of not greater than about 5 Oersteds.

9. A magnetic recording medium as recited in claim 1, wherein said soft magnetic underlayer has a magnetic permeability of at least about 50.

10. A magnetic recording device as recited in claim 1, wherein said soft magnetic underlayer has a thickness sufficient to prevent saturation of said underlayer by said perpendicular write head.

11. A magnetic recording device as recited in claim 1, wherein said soft magnetic underlayer has a thickness of at least about 30 nanometers.

12. A magnetic recording device as recited in claim 1, wherein said soft magnetic underlayer has a thickness of from about 30 nanometers to about 200 nanometers.

13. A magnetic recording device as recited in claim 1, wherein said longitudinal magnetic recording layer has a coercivity of at least about 4000 Oe.

14. A magnetic recording device as recited in claim 2, wherein the distance from the top of said soft magnetic underlayer to said write pole tip is about equal to the distance from said write pole tip to said write shield.

15. A magnetic recording device as recited in claim 1, wherein the distance from the top of said soft magnetic underlayer to the center of said longitudinal magnetic recording layer is about equal to the magnetic spacing during operation of said magnetic recording device.

16. A magnetic recording device as recited in claim 1, wherein the distance from the top of said soft magnetic underlayer to the center of said longitudinal magnetic recording layer is from about 13 to about 31 nanometers.

17. A magnetic recording device as recited in claim 1, wherein the magnetic spacing is from about 10 to about 30 nanometers.

18. A magnetic recording device, comprising:
a) a shielded pole write head having a write pole tip and a write shield; and
b) a magnetic recording medium disposed under said shielded pole write head, said magnetic recording medium comprising:
i) a soft magnetic underlayer having a magnetic permeability of at least about 50;
ii) a non-magnetic spacer layer disposed over said underlayer; and
iii) a longitudinal magnetic recording layer disposed over said non-magnetic spacer layer.

19. A magnetic recording device as recited in claim 18, wherein said underlayer has a thickness of at least about 30 nanometers.

20. A magnetic recording device as recited in claim 18, wherein said underlayer has a thickness of from about 100 nanometers to about 200 nanometers.

21. A magnetic recording medium as recited in claim 18 wherein said underlayer has a magnetic permeability of at least about 100.

22. A magnetic recording medium as recited in claim 18, wherein said underlayer has a magnetic coercivity of not greater than about 5 Oe.

23. A magnetic recording device as recited in claim 18, wherein said non-magnetic spacer layer has a thickness of not greater than about 40 nanometers.

24. A magnetic recording device as recited in claim 18, wherein said non-magnetic spacer layer has a thickness of not greater than about 20 nanometers.

25. A magnetic recording device as recited in claim 18, wherein said non-magnetic spacer layer has a thickness of from about 10 nanometers to about 25 nanometers.

26. A magnetic recording device as recited in claim 18, wherein said longitudinal magnetic recording layer has a coercivity of at least about 4000 Oe.

27. A magnetic recording device as recited in claim 18, wherein the distance from the top of said soft magnetic underlayer to said write pole tip is about equal to the distance from said write pole tip to said write shield.

28. A magnetic recording device as recited in claim 18, wherein the distance from the top of said soft magnetic underlayer to the center of said longitudinal magnetic recording layer is about equal to the magnetic spacing during operation of said magnetic recording device.

29. A magnetic recording device as recited in claim 18, wherein the distance from the top of said soft magnetic underlayer to the center of said longitudinal magnetic recording layer is from about 13 to about 31 nanometers.

30. A magnetic recording device as recited in claim 18, wherein the magnetic spacing is from about 10 to about 30 nanometers.

31. A magnetic recording device as recited in claim 18, wherein said shielded pole write head comprises a write coil and a bucking coil having an equal number of turns.

32. A magnetic recording device as recited in claim 18, wherein said shielded pole write head comprises a write coil and a bucking coil and wherein said bucking coil has fewer turns than said write coil.

33. A magnetic recording device as recited in claim 18, wherein said shielded pole write head comprises a write pole and a write coil wrapped around said write pole.

34. A magnetic recording medium, comprising:
a) a substrate;
b) an underlayer disposed over said substrate, said underlayer having a magnetic permeability of at least about 50;
c) a non-magnetic spacer layer disposed over said underlayer, said non-magnetic spacer layer having a thickness of not greater than about 40 nanometers; and
d) a longitudinal magnetic recording layer disposed over said non-magnetic spacer layer, said longitudinal recording layer comprising a cobalt-based alloy having a coercivity of at least about 4000 Oe.

35. A magnetic recording medium as recited in claim 34, wherein said substrate is a rigid substrate.

36. A magnetic recording medium as recited in claim 34, wherein said underlayer has a magnetic permeability of at least about 100.

37. A magnetic recording medium as recited in claim 34, wherein said underlayer has a magnetic coercivity of not greater than about 5 Oe.

38. A magnetic recording medium as recited in claim 34, wherein said underlayer has a magnetic coercivity of not greater than about 2 Oe.

39. A magnetic recording medium as recited in claim 34, wherein said underlayer has a thickness of at least about 30 nanometers.

40. A magnetic recording medium as recited in claim 34, wherein said underlayer has a thickness of at least about 100 nanometers.

41. A magnetic recording medium as recited in claim 34, wherein said underlayer has a thickness of from about 100 nanometers to about 200 nanometers.

42. A magnetic recording medium as recited in claim 34, wherein said underlayer is fabricated from a material selected from the group consisting of NiFe, FeTaC and CoZrNb.

43. A magnetic recording medium as recited in claim 34, wherein said non-magnetic spacer layer has a thickness of from about 10 nanometers to about 25 nanometers.

44. A magnetic recording device, comprising:
   a) a perpendicular write head comprising a write pole having a write pole tip, and a return pole; and
   b) a recording medium comprising a longitudinal magnetic recording layer having a coercivity of at least about 4000 Oe and a soft magnetic underlayer, wherein during operation of said magnetic recording device said longitudinal recording layer is disposed in relation to said perpendicular write head to place said magnetic recording layer within an effective write gap formed by said perpendicular write head and said underlayer.

* * * * *